Patented Dec. 10, 1935

2,023,980

UNITED STATES PATENT OFFICE 2,023,980

PROCESS FOR BREAKING PETROLEUM EMULSIONS

Charles N. Stehr, Alhambra, Calif., assignor to Tretolite Company, Webster Groves, Mo., a corporation of Missouri No Drawing. Application November 12, 1934, Serial No. 752,715

7 Claims. (Cl. 196—4)

This invention relates to the treatment of emulsions of mineral oil and water, such as petroleum emulsions, for the purpose of separating the oil from the water.

Petroleum emulsions are of the water-in-oil type, and comprise fine droplets of naturally-occurring waters or brines, dispersed in a more or less permanent state throughout the oil which constitutes the continuous phase of the emulsion. They are obtained from producing wells and from the bottoms of oil storage tanks, and are commonly referred to as "cut oil", "roily oil", "emulsified oil", and "bottom settlings".

The object of my invention is to provide a novel, inexpensive and efficient process for separating emulsions of the kind referred to into their component parts of oil and water or brine.

Briefly described, my process consists in subjecting a petroleum emulsion of the water-in-oil type, to the action of a treating agent or demulsifying agent of a particular composition hereinafter described, thereby causing the emulsion to break down and separate into its component parts of oil and water or brine, when the emulsion is permitted to remain in a quiescent state after such treatment, or subjected to an equivalent separatory procedure.

The treating agent or demulsifying agent contemplated by my process is of the kind that employs a conventionally blown oil derived from a mixture of castor oil and semi-drying vegetable oils, within certain definite limits, hereinafter specified.

Conventionally blown castor oil has been used in the demulsification of crude oil emulsions. It may be used in the manner described in U. S. Patent No. 1,929,399, to Fuchs, dated October 3, 1933. Conventionally blown castor oil or other similar oils may be used in specific mixtures of the kind described in co-pending application for patent Serial No. 715,773, of DeGroote and Wirtel, filed March 15, 1934. Conventionally blown castor oil or similar materials may be employed in peculiar mixtures of the kind described in my co-pending application for patent Serial No. 752,713, filed November 12, 1934.

Although conventionally blown oils, as distinguished from super-oxidized blown oils of the kind described in my co-pending application for patent Serial No. 752,714, filed November 12, 1934, may be prepared from other oils than castor oil, such as corn oil, rape oil, cottonseed oil and the like, and such blown oils may be suitable in the arts for the purposes for which blown oils were originally intended, i. e., for use in lubricants, for plasticizers of artificial leather, and the like, yet I have not found such blown oils, that is, conventionally blown oils derived from cottonseed oil, rapeseed oil and the like, to be suitable for demulsification of crude oil emulsions.

I have found, however, that when various oils in substantial amounts are added to castor oil and the mixture is blown in the conventional manner, that the resulting blown oil may or may not be of value in the treatment of water-in-oil emulsions. For instance, the addition of a non-drying oil, such as olive oil or red oil, to castor oil, with subsequent conventional oxidation, does not result in a blown oil of any marked value for breaking oil field emulsions. Similarly, I have found that when substantial percentages, for instance, 20 to 60% of drying oils, such as linseed oil, perilla oil, tung oil and the like, are added to castor oil and then blown in the conventional manner, similarly the resultant product is of little utility in the treatment of oil field emulsions, and indeed, may become almost leathery in character.

However, I have discovered that when semi-drying vegetable oils are mixed with castor oil in such proportion that the castor oil constitutes from 40 to 80% of the mixture, and the semi-drying oils or combination thereof constitute 60 to 20% of the mixture, and when said mixture is blown in the conventional manner for producing blown oils, as distinguished from the manner of producing super-oxidized, semi-livery blown oils contemplated for use in my co-pending application for patent Serial No. 752,714, filed November 12, 1934, that certain blown oils derived from this specific mixture are of marked utility or value, and in many instances yield a blown oil much more effective for the demulsification of crude oil than conventionally blown castor oil, and invariably yield a product which has much more value for breaking oil field emulsions than that enjoyed by blown oils derived by the conventional oxidation of semi-drying oils in the absence of castor oil.

It is also a peculiar fact that the blown oil derived by simultaneous oxidation of such mixture acts differently, and in most instances, more effectively than mixtures of blown oils derived by oxidation of each oil separately with subsequent mixture in comparable proportions to those indicated previously. I believe that during the oxidation process, chemical combination takes place between derivatives of the various raw materials, so as to produce compounds of a kind which could not originate in a mechanical mixture of blown oils. The character of the reactions which occur during the oxidation or manufacture of blown oils is not fully understood.

Semi-drying oils are generally divided into two classes. The first class consists of what is known as the cottonseed oil group, and the second class consists of what is known as the rape oil group. I have found that members of either division of the semi-drying oils are satisfactory. Rapeseed oil is the best known member of the rape oil group. Corn oil, cotton oil and sesame oil are well known members of the cottonseed oil group.

The blown oils contemplated for use in the present process are derived by making mixtures in which the castor oil constitutes 40 to 80% of the mixture, and the remaining 20 to 60% is composed of one or more of the above mentioned semi-drying oils. Obviously, instead of the glycerides, one may employ the fatty acids or a mixture of fatty acids and glycerides instead of either one alone. My preferred mixture is derived by oxidation of 60 parts of castor oil, 20 parts of rapeseed oil and 20 parts of corn oil. Such mixture is subjected to the conventional oxidizing or blowing process, so as to yield a conventional blown oil, characterized by the fact that it is still considerably short of kerosene-insolubility, and does not exhibit any semi-livery properties. It is the type of oil that, although intended primarily as a reagent in the demulsification of crude oil, might be used for the same purposes in the arts, for which blown oils are ordinarily intended, i. e., the manufacture of lubricants, or as a plasticizer in the manufacture of artificial leather, or the like.

Such conventionally oxidized oils may be used as such, or may be used after dilution with any suitable solvent, particularly a petroleum hydrocarbon distillate, such as kerosene, gasoline, or the like, or a coal tar distillate such as benzol, xylene, solvent naphtha, or the like. Various solvents of the kind ordinarily employed in the dilution of demulsifying agents may be used.

I do not find it desirable to convert this material into a salt, by saponification with caustic soda or caustic potash. If desired, the acidic hydrogen may be neutralized with triethanolamine, or a similar base, which will neutralize the acidic hydrogen without the decomposition of esters or bodies of allied structure.

Blown oils of the kind herein described may be used in combination with the well-known demulsifying agents, and may be used in combination with plain unacted-on fatty acids or oils. I find that one can advantageously employ blown oils of the kind herein described in combinations of the kind contemplated for use in breaking oil field emulsions in my co-pending application for patent Serial No. 752,713, filed November 12, 1934.

My preferred reagent is produced in substantially the following manner:

120 lbs. of castor oil is mixed with 40 lbs. of corn oil and 40 lbs. of rapeseed oil. The mixture is heated to approximately 150° C. and then slowly oxidized with a rise in temperature of not over 100° C. by means of a current of air until the viscosity is increased so that the material is considerably increased in specific gravity and viscosity, but is still essentially a thick oil, as distinguished from a material having semi-livery characteristics. Such conventional procedure should yield a blown oil of marked advantage for use in my process. Such a blown oil is, furthermore, characterized by the fact that oxidation may be prolonged to a considerable degree before insolubility in kerosene is reached. I prefer to mix such a blown oil with an equal volume of kerosene, and then add triethanolamine until the acidic hydrogen is neutralized.

The superiority of the reagent or demulsifying agent contemplated by my process is based upon its ability to treat certain emulsions more advantageously and at a somewhat lower cost than is possible with other known demulsifiers, or conventional mixtures thereof. It is believed that the particular demulsifying agent or treating agent herein described will find comparatively limited application, so far as the majority of oil field emulsions are concerned; but I have found that such a demulsifying agent has commercial value, as it will economically break or resolve said oil field emulsions in a certain number of cases which cannot be treated as easily and at so low a cost with the demulsifying agents heretofore available.

In practicing my process, a treating agent or demulsifying agent of the kind described above may be brought in contact with the emulsion to be treated in any of the numerous ways now employed in the treatment of petroleum emulsions of the water-in-oil type with chemical demulsifying agents, such, for example, as by introducing the treating agent into the well in which the emulsion is produced; introducing the treating agent into a conduit through which the emulsion is flowing; introducing the treating agent into a tank in which the emulsion is stored; or introducing the treating agent into a container that holds a sludge obtained from the bottom of an oil storage tank. In some instances, it may be advisable to introduce the treating agent into a producing well in such a way that it will become mixed with water and oil that are emerging from the surrounding strata, before said water and oil enter the barrel of the well pump or the tubing up through which said water and oil flow to the surface of the ground. After treatment, the emulsion is allowed to stand in a quiescent state, usually in a settling tank, and usually at a temperature varying from atmospheric temperature to about 200° F., so as to permit the water or brine to separate from the oil, it being preferable to keep the temperature low enough to prevent the volatilization of valuable constituents of the oil. If desired, the treated emulsion may be acted upon by one or more of the various kinds of apparatus now used in the operation of breaking petroleum emulsions, such as homogenizers, hay tanks, gun barrels, filters, centrifuges, or electrical dehydrators.

The amount of treating agent that may be required to break the emulsion may vary from approximately 1 part of treating agent to 500 parts of emulsion, up to 1 part of treating agent to 20,000 or even 30,000 parts of emulsion. The proportion depends on the type of emulsion being treated, and also upon the equipment being used, and the temperature employed. In treating exceptionally refractory emulsions of the kinds known as "tank bottoms" and "residual pit oils", the ratio of 1:500 above referred to, may be required. In treating fresh emulsion, i. e., emulsions that will yield readily to the action of chemical demulsifying agents, the ratio of 1:30,000, above referred to, may be sufficient to produce highly satisfactory results. In general, we have found that for an average petroleum emulsion a ratio of 1 part of treating agent to 5,000 parts of emulsion will usually be found to produce commercially satisfactory results.

Having thus described my invention, what I claim as new and desire to secure by Letters Patent is:

1. A process for breaking petroleum emulsions of the water-in-oil type, which consists in subjecting the emulsion to the action of a demulsifying agent characterized by being derived by the conventional oxidation of a mixture of castor oil and at least one semi-drying oil, in which mixture, castor oil constitutes 40 to 80% of the total.

2. A process for breaking petroleum emulsions of the water-in-oil type, which consists in subjecting the emulsion to the action of a demulsifying agent characterized by being derived by the conventional oxidation of a mixture of castor oil and at least one semi-drying oil of the rape oil group, in which mixture, castor oil constitutes 40 to 80% of the total.

3. A process for breaking petroleum emulsions of the water-in-oil type, which consists in subjecting the emulsion to the action of a demulsifying agent characterized by being derived by the conventional oxidation of a mixture of castor oil and one member of the rape oil group of semi-drying oils and also one member of the cotton seed oil group of semi-drying oils and in which mixture castor oil constitutes 40 to 80% of the total.

4. A process for breaking petroleum emulsions of the water-in-oil type, which consists in subjecting the emulsion to the action of a demulsifying agent characterized by being derived by the conventional oxidation of a mixture of castor oil and one member of the rape oil group of semi-drying oils and also one member of the cottonseed oil group of semi-drying oils and in which mixture castor oil constitutes 40 to 80% of the total, and said demulsifying agent being diluted with a petroleum hydrocarbon.

5. A process for breaking petroleum emulsions of the water-in-oil type, which consists in subjecting the emulsion to the action of a demulsifying agent characterized by being derived by the conventional oxidation of a mixture of castor oil and one member of the rape oil group of semi-drying oils and also one member of the cottonseed oil group of semi-drying oils and in which mixture castor oil constitutes 40 to 80% of the total, and said demulsifying agent being diluted with kerosene.

6. A process for breaking petroleum emulsions of the water-in-oil type, which consists in subjecting the emulsion to the action of a demulsifying agent characterized by being derived by the conventional oxidation of a mixture of castor oil and one member of the rape oil group of semi-drying oils and also one member of the cottonseed oil group of semi-drying oils and in which mixture castor oil constitutes 40 to 80% of the total, and said demulsifying agent being diluted with an equal volume of kerosene.

7. A process for breaking petroleum emulsions of the water-in-oil type, which consists in subjecting the emulsion to the action of a demulsifying agent characterized by being derived by the conventional oxidation of a mixture of castor oil and one member of the rape oil group of semi-drying oils and also one member of the cottonseed oil group of semi-drying oils and in which mixture castor oil constitutes 40 to 80% of the total, and said demulsifying agent being diluted with an equal volume of kerosene and with the subsequent addition of sufficient triethanolamine to neutralize the acidic hydrogen.

CHARLES N. STEHR.